INVENTORS M. A. DUGUAY
P. M. RENTZEPIS

BY David P. Hellen
ATTORNEY

United States Patent Office 3,521,070
Patented July 21, 1970

3,521,070
OPTICAL GATE
Michel A. Duguay, Union, and Peter M. Rentzepis, Morris, N.J., assignors to Bell Telephone Laboratories, Incorporated, Murray Hill, N.J., a corporation of New York
Filed Nov. 24, 1967, Ser. No. 685,640
Int. Cl. H04b 9/00
U.S. Cl. 250—199                                  9 Claims

ABSTRACT OF THE DISCLOSURE

A picosecond light gate absorbs an optical information pulse only when it is coincident with an optical gate pulse. The gate includes a medium in which the gate pulse induces a population inversion resulting in nearly total absorption of the information pulse. In the absence of the gate pulse no population inversion occurs, and the information pulse is nearly totally transmitted through the medium.

BACKGROUND OF THE INVENTION

This invention relates to logic devices and more particularly to picosecond optical gates utilizing coherence effects.

Recent developments in the laser art have made it possible to phase-lock the oscillating modes of a laser by any of several well-known techniques including synchronous modulation and Q-switching. The output of a phase-locked laser is a pulse train having a pulse repetition rate given by $c/2L$, where $c$ is the velocity of light and $L$ is the length of the active medium. More importantly, however, the pulses generated are typically in the picosecond range. Such pulses, which are also produced by stimulated Raman emission, are ideally suited to serve as the carrier for an optical pulse code modulation system. The pulse train may be encoded by the elimination of selected ones of the pulses in accordance with logical information to be transmitted. The pulses are generally eliminated by positioning in the transmission path a device termed an optical gate which ideally either completely transmits a pulse undistorted or completely absorbs the pulse. To function as described the optical gate preferably has a rise time shorter than the pulse spacing of the information pulse train. In the case where the pulse train is generated by a mode-locked laser, for example, the pulse spacing may be of the order of several picoseconds. Prior art optical gates, however, do not generally have rise times in the picosecond range.

SUMMARY OF THE INVENTION

The present invention in one embodiment is a picosecond optical gate which absorbs an optical information pulse when it is coincident with an optical gate pulse, but otherwise transmits the information pulse. The gate includes a medium (e.g., ruby or certain dyes such as cryptocyanine) characterized by an absorption of optical signals that can be switched between extreme values by inducing a population inversion in the medium. The frequency of the gate pulse is chosen to correspond to the energy separation $E_g$ between the levels of the medium to be inverted. Its power and the pulse width (picoseconds) are chosen such that nearly total inversion occurs, all electrons being excited from the lower to the higher level (i.e., the gate pulse is preferably a 180° pulse). The frequency $f_1$ of the information pulse is chosen such that, when the gate pulse is absent, no absorption occurs by the lower level, i.e., no allowed state exists at an energy $hf_1$ about the lower level and $hf_1 < E_g$, neglecting for the moment the absorption band of vibrational levels associated with the aforementioned lower level. The information pulse is therefore nearly totally transmitted. When the gate pulse is coincident with the information pulse, however, absorption occurs by the upper level, i.e., an allowed state exists at an energy $hf_1$ above upper level. The information pulse is therefore nearly totally absorbed.

The rise time of the optical gate corresponds to the time required to excite electrons from the lower to the higher energy level (or vice versa), and is generally equal to the rise time of the gate pulse which may be as low as fractions of a picosecond. The optical gate of the present invention is therefore ideally suited to encode pulse trains having picosecond pulse spacing such as those generated by mode-locked lasers, for example.

BRIEF DESCRIPTION OF THE DRAWINGS

The invention, together with its various features and advantages, can be easily understood from the following more detailed description taken in conjunction with the accompanying drawings, in which.

DETAILED DESCRIPTION

Figure 1:
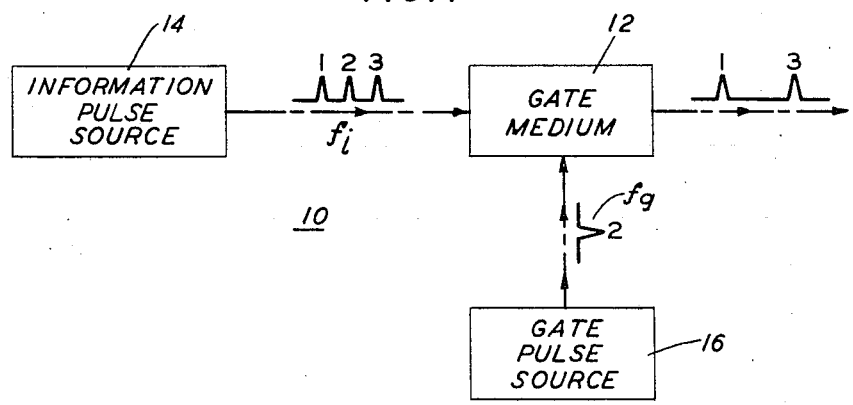
FIG. 1 is a schematic of one embodiment of the invention.

Turning now to FIG. 1, there is shown an optical gate 10 comprising a gate medium 12 which includes a material characterized by an absorption of optical signals that can be switched between extreme values by inducing a population inversion in the material. Into the medium 12 are directed information pulses and gate pulses from the sources 14 and 16, respectively. The sources 14 and 16 are typically lasers which generate pulses of picosecond width and pulse trains of picosecond spacing. The gate 10 absorbs an optical information pulse when it is coincident with and overlaps an optical gate pulse within the medium 12, but otherwise transmits the information pulse. The gate 10 operates as an encoder in the case that the information pulse train is the carrier of a pulse code modulation system, the gate pulses being made coincident with selected information pulses in accordance with information to be conveyed. Thus, for the example shown in FIG. 1, the second information pulse overlaps and is coincident with the single gate pulse and is therefore absorbed by the medium 12. The first and third information pulses are transmitted through the medium 12, however, because they are not coincident with, and do not overlap, any gate pulse. By properly synchronizing the gate pulses to be coincident with and to overlap within the medium appropriate information pulses, the information pulse train is encoded. The synchronization may, of course, be performed by means well known in the art without deviating from the spirit and scope of the invention.

Figure 2A:
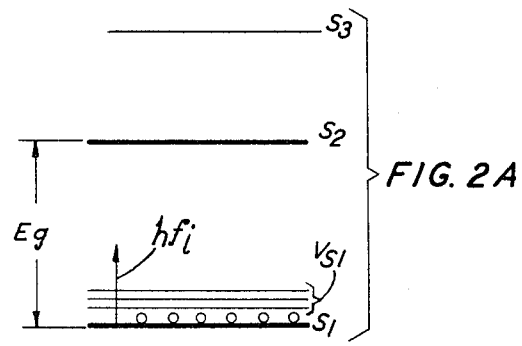
FIG. 2A is a schematic of a portion of an energy level diagram of an active medium before it absorbs a gate pulse.
Figure 2B:
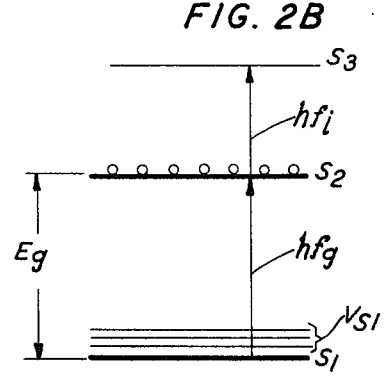
FIG. 2B is a schematic of a portion of an energy level diagram of an active medium after it absorbs both a gate pulse and an information pulse.

The mechanism by which the medium 12 is made to selectively transmit or absorb appropriate pulses is easily understood with reference to FIGS. 2A and 2B which show a portion of energy level diagrams of a typical material included in the gate medium 12. The material is characterized by a pair of electron energy levels $S_1$ and $S_2$ separated by an energy gap $E_g$, and a third energy level $S_3$ above the higher energy level $S_2$. Normally the energy level $S_1$, being the lowest, is highly populated with electrons, but each of the levels $S_2$ and $S_3$ by comparison are virtually unpopulated. The absorption of a signal at frequency $f$ occurs if electrons are excited by that signal from the ground state $S_1$ to an allowed energy level; that is, a level of energy $hf$, where $h$ is Planck's constant, greater than the energy of states $S_1$. In general, however, should substantially all the electrons be in some state other than $S_1$ initially, the allowed state would be defined as any state of energy $hf$ greater than the initial state.

Consider, for example, the situation depicted in FIG. 2A. The ground state $S_1$ is highly populated with electrons (depicted as small circles), and both states $S_2$ and $S_3$ are virtually unpopulated by comparison. An information pulse at frequency $f_i$ such that $hf_i < E_g$ is directed into the gate medium and is not absorbed by the ground state $S_1$ because there exists no allowed state at an energy $hf_i$ above the level $S_1$. To assure no absorption by $S_1$ under these condtions, $hf_i$ is preferably made to be greater than the energy of the vibrational levels $VS_1$ associated with $S_1$. The information pulse is therefore nearly totally transmitted except for inconsequential absorption by state $S_2$ (or higher energy states) i.e., an insignificant number of electrons might be excited from state $S_2$ to a state having an energy $hf_1$ greater than $S_2$.

Referring now to FIG. 2B, the medium can be made to absorb almost totally such an information pulse by making the gate pulse coincident within the medium with the information pulse. The gate pulse is preferably selected bo be a pulse termed in the art as a 180° pulse in order to create an electron population inversion between states $S_1$ and $S_2$. That is, the gate pulse causes the state $S_2$ to be more highly populated than state $S_1$. Preferably, the gate pulse causes nearly all electrons in state $S_1$ to be excited to state $S_2$. This population inversion is accomplished (1) by selecting the frequency $f_g$ of the gate pulse to correspond to the energy gap, i.e., $hf_g = E_g$, (2) by making the gate pulse of sufficiently high power to excite nearly all electrons from $S_1$ to $S_2$, and (3) by making the gate pulse width (typically two picoseconds) less than the relaxation time of the level $S_2$.

In order that the information pulse be absorbed, its frequency $f_i$ must correspond an energy $hf_i$ equal to the difference in energy between states $S_2$ and $S_3$. When the population inversion is produced by the gate pulse, the information pulse is nearly totally absorbed by state $S_2$; that is, the information pulse excites the electrons in state $S_2$ to the allowed state $S_3$. The gate which is therefore "open" may be "closed" by applying a second 180° gate pulse to the medium in order to destroy the population inversion between $S_1$ and $S_2$. The second 180° gate pulse, which may be generated by source 16 or by a second gate pulse source, not shown, causes the excited electrons in $S_2$ to fall back to state $S_1$, thereby making state $S_1$ again more highly populated than state $S_2$. The gate now transmits information pulses until another 180° gate pulse is made coincident therewith as previously described.

The pulse spacing of the information pulse train is typically of the order of several picoseconds. The rise time of the optical gate (i.e., the time required to excite electrons from $S_1$ to $S_2$) is preferably shorter than the information pulse spacing in order that the gate be able to operate (i.e., absorb or transmit) on the information pulses separately. Rise times of the order of fractions of a picosecond are feasible and rise times as short as $10^{-15}$ seconds are ideally possible.

The medium 12 typically comprises such materials as cryptocyanine, a phthalocyanine and polymethene. Other materials include ruby, commercially available dyes such as Kodak-Eastman 9760 and 9740, or rose bengal tetrachlorotetraiodofluorescein). In ruby containing .02 weight percent $Cr_2O_3$, for example, states $S_1$, $S_2$ and $S_3$ in one case correspond to respectively the $(t_2^3)$ $^4A_2$, $t_2^3$ $^2E$, and $t_2^3$ $^2T_2$ levels which have respective wave numbers of zero, 14,418 cm.$^{-1}$ and 21,068 cm.$^{-1}$. The $t_2^3$ $^2E$ level has a lifetime in the order of milliseconds. The 180° gate pulse thus might have a 2 psec. duration, a 600 gw./cm.$^2$ power level and frequency $f_g$ of about $4.32 \times 10^{14}$ c.p.s. The information pulse could have a frequency $f_i$ of about $2 \times 10^{14}$ c.p.s.

In rose bengal, on the other hand, state $S_1$ is a singlet state at ground level, $S_2$ is a singlet state at about 18,000 cm.$^{-1}$ and $S_3$ is a triplet state at about 26,700 cm.$^{-1}$. The gate pulse frequency $f_{go}$ required to open the gate (i.e., to excite electrons from $S_1$ to $S_2$) is therefore about $5.4 \times 10^{14}$ c.p.s., but the information pulse frequency is only about $3.5 \times 10^{14}$ c.p.s., because the transition from $S_1$ to $S_2$ is followed by a spontaneous nonradiative transition from $S_2$ to a resonant triplet level at about 15,000 cm.$^{-1}$ (i.e., the information pulse frequency corresponds to the difference in energy between the level at 15,000 cm.$^{-1}$ and the $S_3$ level at 26,700 cm.$^{-1}$). Accordingly, the gate pulse frequency $f_{gc}$ required to close the gate would be $4.5 \times 10^{14}$ c.p.s. corresponding to the difference in energy between the resonant triplet state at 15,000 cm.$^{-1}$ and the ground state.

In a phthalocyanine, such as $H_2pc$, where the state $S_3$ is at 6200 A. and $S_2$ is at 6800 A., the corresponding gate and information pulse frequencies are, respectively, about $4.42 \times 10^{14}$ c.p.s. and $0.43 \times 10^{14}$ c.p.s.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. An optical gate comprising
a medium for controlling the transmission of an optical information signal, said medium having an energy gap defined by a higher and a lower energy level, and being further characterized by a third energy level above the higher energy level, the higher level having a characteristic relaxation time, and the optical information signal having a frequency such that its energy is less than the energy gap but but substantially equal to the energy separation between the higher energy level and the third energy level, and
means for inducing an electron population inversion between the higher and the lower energy levels comprising means for making an optical gating pulse coincident with the optical information signal within the medium, the gating pulse having a frequency such that its energy corresponds to the energy gap, of sufficient energy to excite substantially all electrons from the lower level to the higher level, having a pulse width less than the relaxation time of the higher energy level, whereby the information signal is absorbed by said medium.

2. The optical gate of claim 1 wherein said medium is further characterized by at least one vibrational energy level associated with the lower energy level, and the optical information signal has a frequency such that its energy is greater than the energy of any one of the vibrational levels.

3. The optical gate of claim 1 in combination with means for subsequently descreasing the absorption of the optical signal by said medium comprising means for applying a second gating pulse to said medium.

4. The optical gate of claim 3 wherein said medium is further characterized by a fourth energy level resonant with the higher energy level and the second gating pulse has a frequency corresponding to the energy separation between the lower energy level and the fourth energy level.

5. The optical gate of claim 1 wherein said medium comprises cryptocyanine.

6. The optical gate of claim 1 wherein said medium comprises a phthalocyanine.

7. The optical gate of claim 1 wherein said medium comprises tetrachloro-tetraiodofluorescein.

8. The optical gate of claim 1 wherein said medium comprises ruby.

9. An optical gate comprising
a medium for controlling the transmission of an optical information signal, said medium having an energy gap defined by a higher and a lower energy level, and being further characterized by a third energy level above the higher energy level, the higher level having a characteristic relaxation time, and the optical information signal having a frequency such that its energy is less than the energy gap but corresponding to the energy separation between the higher energy level and the third energy level,
means for inducing an electron population inversion between the higher and the lower energy levels comprising means for making an 180° optical gating pulse coincident with the optical information signal within the medium, whereby the information signal is absorbed by said medium.

References Cited

UNITED STATES PATENTS

| | | | |
|---|---|---|---|
| 3,277,396 | 10/1966 | Statz et al. | 250—199 XR |
| 3,339,073 | 8/1967 | Hunter | 250—199 |
| 3,427,091 | 2/1969 | Erlbach | 332—7.51 XR |

ROBERT L. GRIFFIN, Primary Examiner

R. S. BELL, Assistant Examiner

U.S. Cl. X.R.

332—7.51; 350—160